United States Patent [19]
Huang

[11] Patent Number: 5,339,761
[45] Date of Patent: Aug. 23, 1994

[54] HYDROFOIL CRAFT

[75] Inventor: Wen-Chang Huang, 50-2, Lane 149, Lin Yun Road, Sec. 1, Wu Ku Hsiang, Taipei Hsien, Taiwan

[73] Assignees: Wen-Chang Huang; Te-Yaung Chu, Taiwan

[21] Appl. No.: 21,457

[22] Filed: Feb. 23, 1993

[51] Int. Cl.$^5$ .............................................. B63B 1/24
[52] U.S. Cl. ................................... 114/274; 114/288; 114/291
[58] Field of Search .................. 114/67 A, 67 R, 274, 114/280–282, 288–291, 61; D12/309, 310, 308

[56] References Cited

U.S. PATENT DOCUMENTS

| | | | |
|---|---|---|---|
| 1,217,828 | 2/1917 | Ruhe | 114/291 |
| 1,412,848 | 4/1922 | Dunajeff | 114/291 |
| 3,827,388 | 8/1974 | Fulton | 114/67 A |
| 3,871,317 | 3/1975 | Szpytman | 114/282 |
| 4,665,853 | 5/1987 | Gerdsen et al. | 114/274 |

*Primary Examiner*—Edwin L. Swinehart
*Attorney, Agent, or Firm*—Burns, Doane, Swecker & Mathis

[57] ABSTRACT

A hydrofoil craft according to the invention is provided on the bottom of the hull with at least one, usually several, air cushion recesses arranged along the middle of the bottom in a fore-and-aft direction. The air cushion recesses each forms a groove having the upwardly indented bottom, the upper wall front end, to be deeper and becoming shallower toward the rear end and resembling a triangle or sector in shape when viewed in a longitudinal section and generally to be a rectangle in shape when viewed in a plane. The angle from the shallowest end of the air cushion recess to the deepest end is within 1° to 30° and the two side walls on the sides of the bulwarks of the recess extend a little to the lower parts of the fore-and-aft end walls. The hydrofoils are mounted across the lower parts of the air cushion recesses and are close to the air cushion recesses. The front-wall type upper wall of the front-most air cushion recess is provided at the highest place with at least one blast orifice for ejecting pressure air.

13 Claims, 3 Drawing Sheets

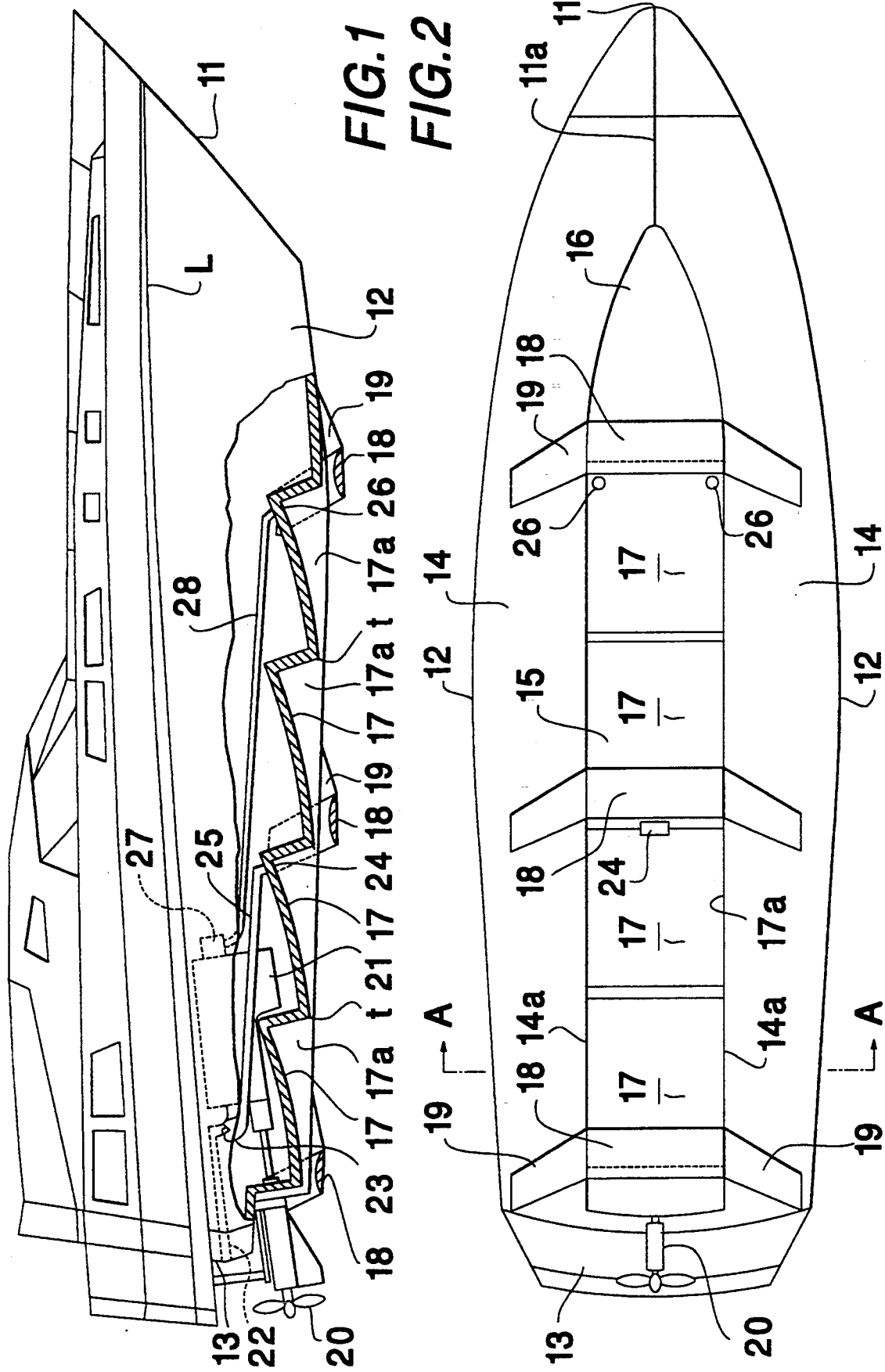

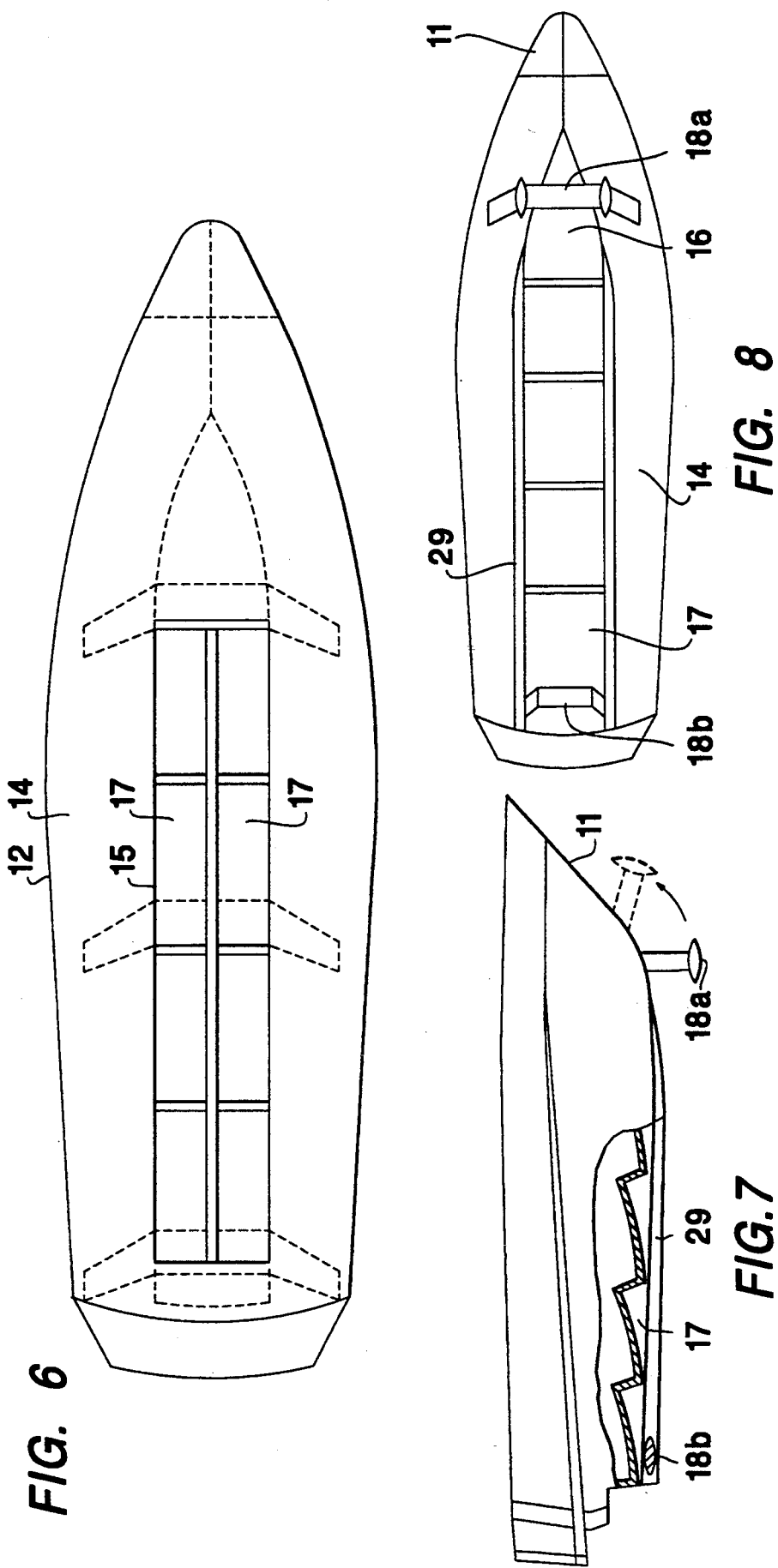

HYDROFOIL CRAFT

BACKGROUND AND SUMMARY OF THE INVENTION

The present invention relates to hydrofoil craft and, more particularly, to improvements in the hull of a hydrofoil craft having on the bottom one or several air cushion recesses arranged in one row or several rows along the longitudinal direction and capable of leading in pressure gas to produce an air cushion effect.

The hydrofoil craft has not always been popularly employed in a large number on sea although such craft have been known for many years. This is mainly because horse power needed to arrive at a gliding or planing state is very large and accordingly, such craft must be equipped with a motor much larger than a general ship. Again, although an air cushion craft has also been used commercially, due to the reason that the hull must utilize a rubber tent or apron to form thereinside an air cushion, the manufacturing and maintenance costs are very high and further, since there is no parts for self stabilizing and supporting and the ride quality is not excellent, the craft must be made considerably large and must sail on a relatively smooth water surface. For the foregoing reasons, it is still difficult for the craft to be used extensively as a general water transport means.

Accordingly, one object of the present invention is to provide a hydrofoil craft having on the bottom at least one row of air cushion recesses arranged in the fore-aft direction, which on gliding produces an excellent air cushion effect thereby lowering resistance of adherence on the craft bottom and achieving quickly a state of hydrofoil gliding or flight.

Another object of the invention is to provide a hydrofoil craft which offers reduced horse power requirements compared to conventional deep-V hull ships having similar payload capacities. The invention is directed to providing such a craft capable of a ship speed between 25 to 60 knots, in which acceleration is fast and ride quality is excellent. It is further an object of the invention to provide a craft which is not easily touched down by wave tips during gliding and having stability characteristics better than ships, of the same breadth.

A further object of the invention is to provide a hydrofoil craft which, when the main engine exhaust or pressure air is filled into the air cushion recesses, produces an air cushion to lift part of the ship weight and at the same time, to separate the water surface adherence side of the recesses, is capable of reducing the back pressure of the main engine to thereby increase the delivery torsion and to attain a flight state within a short time because of a vacuum phenomenon produced inside the air cushion recesses during gliding.

BRIEF DESCRIPTION OF DRAWINGS

The above and other objects and features of the invention will be apparent from the following detailed description by reference to the accompanying drawings, wherein:

FIG. 1 is a partial sectional side view of a typical embodiment of the hydrofoil craft of the present invention;

FIG. 2 is a bottom view of the hydrofoil craft of the invention;

FIG. 6 is a bottom view of a further embodiment of the hydrofoil craft of the invention;

FIG. 7 is a bottom view of a still further embodiment of the hydrofoil craft of the invention; and FIG. 8 is a partial sectional side view of the embodiment shown in FIG. 7.

DETAILED DESCRIPTION OF PREFERRED EMBODIMENTS OF THE INVENTION

Figure 3:
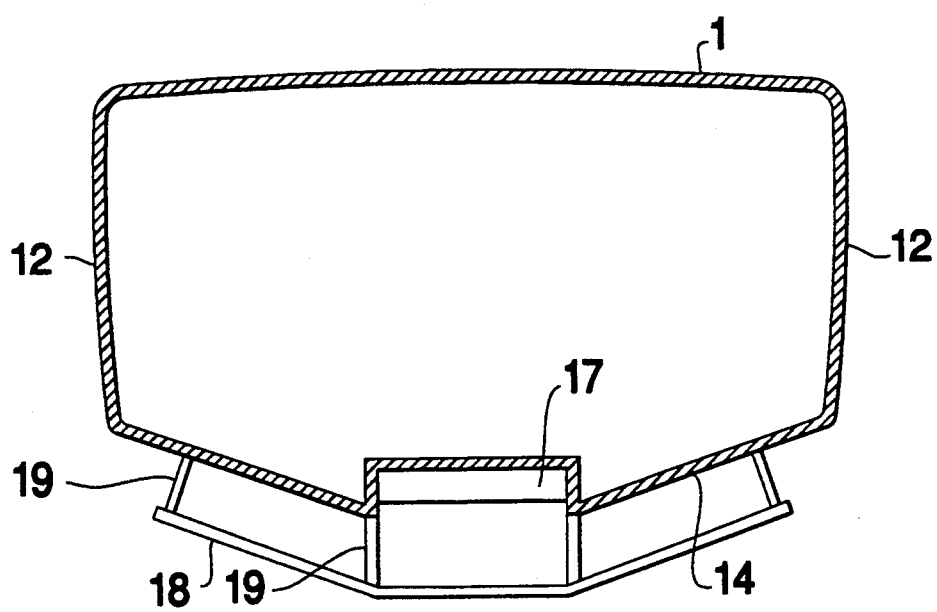
FIG. 3 is a partial sectional view of the hydrofoil craft along the line A—A of FIG. 2.

As shown in FIGS. 1 through 3, the numeral 1 represents essentially the hull of a deep V craft having a bow 11, bulwarks 12, 12, stern 13 and bottom 14. On the aft half of the middle of the base 14 there is formed, extending from adjacent the location of the bow 11 to the stern 13, a generally rectangular horizontal tangent 15 such that the deep V-type hull is truncated. The front of the horizontal tangent 15 is closely connected to a substantially triangular fore base 16 inclined slightly forwardly and upwardly and having the upper end adjoining a bow pillar 11a of the bow 11, whereas in the vicinity and on the above of the water line L the original shape of a deep V hull is maintained.

The rectangular horizontal tangent 15 from the bow side to the aft side is formed with at least one but, usually, with several air cushion recesses 17 arranged in at least one row and being rectangular in shape in a bottom view, As shown in FIG. 1, these air cushion recesses 17 form a groove being deeper at the fore end and becoming gradually shallow toward the aft end and resembling a sector or triangle in shape in longitudinal section having an angle of inclination being approximately 10° to 30°, and more preferably between 2° to 20°, from the shallowest to the deepest. The place where the one shallowest end of a recess at the fore position adjoins with the one deepest end of a recess at the adjacent aft position is sunken a little in the interior of the two walls 17a of the air cushion recess 17 to form a throat t. Thus, in this way when the bottom 14 glides on a calm water surface the air cushion recesses 17 with the help of these throats t communicate fore and aft.

The bottom 14 is provided thereon with short-legged hydrofoil wings 18, at least one at the near bow and one at the near stern. In the embodiment shown in FIGS. 1 and 2 there are three hydrofoil wings 18 disposed, respectively, in the bow, the amidships and the stern. Such a hydrofoil wing 18 is in the form of a truncated V in shape and projects slightly on the lower part of the bottom. The support legs 19 of the hydrofoil wings 18 extend toward the bow and from the aft toward the fore and the upper part and are in an inclined plane to facilitate removal of any flotsams on water. In addition, the stern 13, as in the conventional hydrofoil craft, is provided with a propeller 20.

On the bottom of the stern 13 is mounted the main engine 21 for transmitting power to the propeller 20. This main engine 21 may be a diesel or a gasoline engine, or it may also be a gas turbine, the engine having a main exhaust pipe 22 a auxiliary exhaust pipe 25 from the engine 21 may be branched and sent out by way of a magnetic valve 23 to the exhaust orifice 24 located in the deepest upper end of the closest air cushion recess 17. Since, in the present embodiment, only one engine 21 is shown, there is only one exhaust pipe 25 connected into any one of the air cushion recess 17. However, if more than two engines are provided, there may be added two and more auxilliary exhaust pipes respectively led and connected into different air cushion recesses 17 so that the result will be even better.

The deepest upper end of the first air cushion recess 17 on the stem side is provided with a pair of charge air ejection ports 26, 26. The pair of ports 26,26 are joined by a small guide tube 28 on the side of an exhaust pipe of a turbo charger 27 in the main engine 21. Generally, the diameter of these tubes is only 1/10 to 1/20 of the diameter of the exhaust pipe, that is, the small-diametered guide tube having a sectional area of about 1/100 to 1/400 the sectional area of the exhaust pipe is joined to the charge air ejection port 26.

Figure 4:
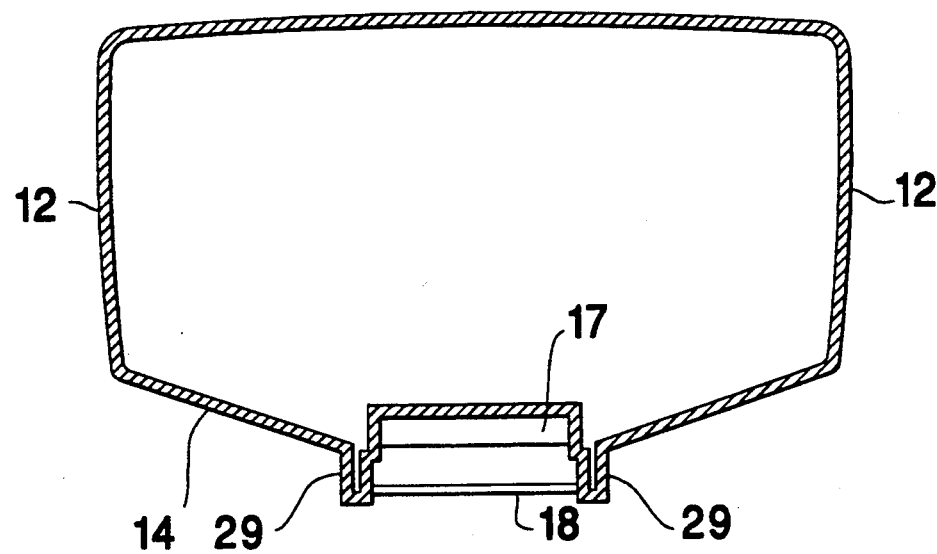
FIG. 4 is a sectional view of another embodiment of the invention corresponding to FIG. 3.

FIG. 4 is a vertical longitudinal sectional view of another embodiment of the present invention, in which the constitution of the air cushion recesses 17 basically is same as in the previous embodiment. In this embodiment two sides of the air cushion recesses 17 are formed by projecting portions of two keels 29, the hydrofoil wings 18 being located between the two keels 29 below the recesses 17. Owing to the presence of the projecting portions of the keels 29 and the location of the hydrofoil wings 18 between the keels (i.e., not protruding), the hydrofoil craft is therefore suitable for voyage on waters where tide difference is large; however, because the hydrofoil wings are small, the "flying" efficiency is less than in the previous embodiment.

Figure 5:
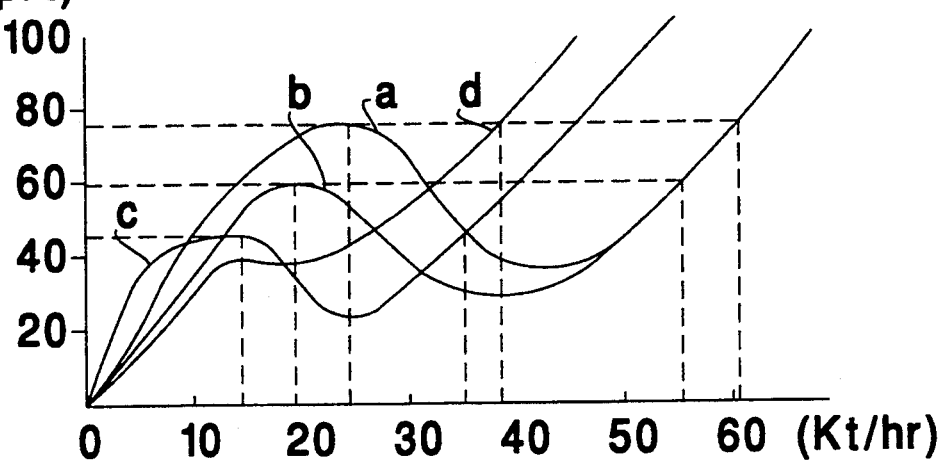
FIG. 5 is a characteristic curve diagram showing comparison of speed-horse power of the hydrofoil craft of the invention with a traditional hydrofoil craft.

FIG. 5 is a characteristic curve diagram showing a comparison between the speed-horse power of the hydrofoil craft of the present invention with a conventional hydrofoil craft. In the graph, a represents the curve of a conventional "high-legged" hydrofoil craft, b, the curve of the hydrofoil craft of the present invention, c, the curve of the hydrofoil craft also of the present invention but provided with hydrofoil wings having twice the amount of water displacement, and d, the curve of a deep V-type craft generally without a hydrofoil wing. From the curve a in the graph, it may be seen that the "high-legged" hydrofoil craft generally requires a considerable horse power at start-up and when reaching a speed close to leaving out of water or "flying", for instance, at a speed of 25 knots (kt/hr), the horse-power requirement is about 75 horse power per ton. Afterward, because there is no relation to the resistance to water surface viscosity and inertia property on skimming over the water surface horse-power requirements may be reduced gradually. However, in reality there is no reduction in horse-power output by the main engine after "flying" and the horse-power output may accordingly reach the speed of above 60 kt/hr. On the other hand the curve d indicates that the horse power required by a deep V-type craft in starting a voyage generally is small and the horse power required in reaching a "fly" speed set up at 16 kt/hr is also small This is due to less resistance to water because of the absence of hydrofoil wings on the craft. However, if the craft of the deep V type is to accelerate and reach a certain higher speed, for instance, of 40 kt/hr, it then requires horse power of a considerable size and is therefore not economical. In curve b it can be seen that, when a hydrofoil craft of the present invention having air cushion recesses and "short-legged" wings is used, there is only about 60 horse power per ton required to permit the hydrofoil craft to "fly" when speed reaches 20 kt/hr. Also, it is possible to reach speeds of about 55 kt/hr under the said horse power. This is made possible because of an air cushion effect produced by the air cushion recesses 17 on the bottom 14 of the craft of the invention after pressurized air is led in, which helps in lifting a part of weight of the hull and separating the adhering face between the recesses and the water surface so that resistance to adherence on the craft bottom falls drastically. Next, the curve c represents a speed-horse power curve when craft of the curve b employs hydrofoil wings of one having a water displacement about twice that of the craft. Because the larger the wings, the greater will be the resistance produced, it may be seen from this graph that the horse power required in starting is relatively large and also the increase in speed is relatively slow. However, the craft starts to fly when speed has reached 16 kt/hr, and it merely requires about 45 horse power per ton for flying to be promptly possible and the speed to be able to reach about 35 kt/hr.

Summing up the conclusion on the above graphs it is to be noted that the hydrofoil craft of the present invention enables a 5 to 60% saving on the engine horse-power requirement, a rapid acceleration and a better wave clearance. In other words, the present invention facilitates obtaining a high speed flight of, for example, above 60 kt/hr, in a hydrofoil craft without requiring a high horse-power engine such as must be used with deep V-type craft, thereby greatly reducing the equipment expenses in the main engine. The lower horse-power requirements of the craft of the present invention is adapted to provide high speeds and efficiencies.

The operation the hydrofoil craft of the present invention will now be described. The engine 21 is first started and, when operations have become normal, the clutch is thrown in to allow torsion from the engine 21 to be transmitted to the propeller 20. The craft starts to move on the water and, at the same time, the main exhaust pipe 22 is closed and the auxilliary exhaust pipe 25 opened by means of the magnetic valve 23. The exhaust air discharged by the main engine 21 is now expelled through the exhaust port 24 into the corresponding recesses 17, while, on the other hand, the small amount of charge air is led through the guide tube 28 by the turbo charger 27 into the ejection port 26. From this port 26 the charge air is ejected into the front-most air cushion recess 17. In this way, after the charge air fills the air cushion recess 17, it flows through the throat t into the successive air cushion recess 17. The charge air fills the successive recess 17 and then flows toward the rear recess until the charge air has filled each and every recesses 17. The charge air is finally blown out from the throat t of the last recess toward the stern 13. Simultaneously, the exhaust air, likewise, is discharged through the exhaust port 24 into the corresponding recess 17 and, after joining with the charge air flowing in from the front recess, flows toward the rear recess to be discharged out thereafter from the stern 13. When charge air and exhaust air enter the air cushion recess 17 the gases are first stored on the above of the deep portion of the recess, at which time the stern 13 and the bottom must still be submerged in the water. The gases that are sealed inside the recess 17 produce now a cushion effect helping in lifting the hull out of the water surface. Until the time when speed of the ship increases gradually and the ship bottom is nearly out of the water surface, owing to the flow of water, the air inside the recess is pulled into a thin face by the adhesive force of water and so the area of air cushion increases greatly. However, since consumption of air is small, following the increase in the speed of ship there is formed between the ship bottom and the water surface a blast of air flow blowing swiftly toward the stern. This blast of air flow, coupled with a jet-pipe action produced by the throat t of the recess 17, forms a partial vacuum on the upper part of the deep portion of the recess. The partial vacuum lowers backpressure of the main engine exhaust air discharged into the region from the exhaust port 24 making possible an increase in delivery torsion by the main engine 21. When the pressure air fills into the recess, the delivery torsion of the main engine 21 permits a fall in the water line of the bulwarks and a decrease in the immersion area brought about by the air cushion recesses thereby enabling the hydrofoil craft of the present invention to arrive at the state of flight. Since it is not easy for the tip of a wave to touch down the ship bottom owing to the presence of air cushion recesses on the bottom there is no need for use of high bases in the foils 18 permitting even a wider range of sail.

A further advantage of the present invention lies in that extremely small amounts of the charge air are continuously introduced into the air cushion recesses 17 directly from the supercharger 27 is the main engine 21 exhaust air is also introduced into the air cushion recesses. At the same time, gas storage capacity of these recesses 17 is also excellent. Such an arrangement renders it possible that the craft need no addition of a blower, which consumes horse power of the main engine, or other air pressure equipments and related complicated control device or operation. Hence, a small horse power requirement of the main engine may be employed to produce a most effective high-speed sail. Based on experiments, it is possible for the craft of the present invention to raise efficiency by 5 to 60% compared to a planing hull of the same speed. It must be pointed out here that the small amount of gas introduced into the air cushion recesses 17 by the super charger may, in reality, cause a slight decrease in pressure in the inlet gas of the main engine 21. However, because the amount of pressure air consumed by the craft of the invention is small and represents merely 1/100 to 1/400 the entire output of the super charger, this has no effect in relation to the main engine 21. Even more, since efficiency of more than an average 30% can be produced because of the above mentioned air cushion effect and the decrease in the discharge of back pressure, the invention may thus be rated as one having an economic benefit and utility value.

FIG. 6 is the bottom view of another embodiment of the present invention showing the air cushion recess 17 being arranged in two rows on a tangent plane 15 of the ship bottom 14.

FIGS. 7 to 8 show a still further embodiment of the invention, in this embodiment the ship bottom 14 has a row of air cushion recesses 17. The first recess 17 is formed on the front with an inclined triangular front bottom face 16 extending forward to the head column. Next, on the two sides from the first air cushion recess to the front end of the last air cushion recess are formed with two keels 29 projecting on the lower part of each of the air cushion recesses 17 and further on the bottom face of the bow and close to the bottom face of the stern are provided each with a foil 18a, 18b. The foil 18a at the bow is formed to be collapsible by a pivot while the foil 18b at the stern is placed between the two keels 29 and maintains at approximately the same plane as the bottom faces of the keels.

While this invention has been illustrated and described in accordance with a preferred embodiment, it is recognized that variations and changes may be made therein without departing from the invention as set forth in the claims.

What is claimed is:

1. A hydrofoil craft comprising:
   a hull having a bottom side;
   at least one air cushion recess extending along the bottom side in a fore-and-aft direction, the air cushion recess being in the form of a hollow groove and being of greater depth toward a bow end of the air cushion recess and becoming shallower toward an aft end of the air cushion recess, the air cushion recess being substantially triangular in shape along a longitudinal section of the hull and substantially rectangular in plan view, the air cushion recess being disposed below an at-rest waterline of the hydrofoil craft;
   at least one foil disposed on the bottom side and extending transversely across the air cushion recess; and
   at least one jet means for ejecting pressurized gas into the air cushion recess, the jet means being disposed in a forward portion of the air cushion recess.

2. The hydrofoil craft according to claim 1, wherein there are at least two air cushion recesses arranged in a fore-and-aft direction relative to one another, and wherein an included angle of each air cushion recess between a tangent line extending form the aft end of each air cushion recess to the bow end of each air cushion recess and a horizontal plane is between 1° and 30°, and two side walls of each recess extend past end walls of the fore and aft ends of each recess, thereby forming a communicating throat portion between successive fore and aft air cushion recesses.

3. The hydrofoil craft according to claim 1, wherein the foil extends across the aft end of the air cushion recess.

4. The hydrofoil craft according to claim 1, further comprising a main engine having an exhaust pipe, and an auxiliary exhaust pipe branched off from the exhaust pipe, the jet means communicating with the auxiliary exhaust pipe.

5. The hydrofoil craft according to claim 1, further comprising a main engine having turbocharger, a guide pipe branched off from the turbocharger, and at least one second jet means in the air cushion recess, the second jet means being in communication with the guide pipe.

6. The hydrofoil craft according to claim 1, wherein the air cushion recess is defined on two sides by projecting portions of two parallel keels extending in a longitudinal direction along the bottom side, and the foil being disposed completely between the two keels at the aft end of the air cushion recess.

7. The hydrofoil craft according to claim 4, further comprising a turbocharger for the main engine, a guide pipe branched off from the turbocharger, and at least one second jet orifice in the air cushion recess, the second jet orifice being in communication with the guide pipe.

8. The hydrofoil craft according to claim 2, wherein each air cushion recess is defined on two sides by projecting portions of two parallel keels extending in a longitudinal direction along the bottom side, and the foil being disposed completely between the two keels at the aft end of at least one of the air cushion recesses.

9. The hydrofoil craft according to claim 3, wherein the air cushion recess is defined on two sides by projecting portions of two parallel keels extending in a longitudinal direction along the bottom side, and the foil being disposed completely between the two keels at the aft end of the air cushion recess.

10. The hydrofoil craft according to claim 1, wherein the air cushion recess extends along a middle portion of the bottom side.

11. The hydrofoil craft according to claim 1, wherein two or more air cushion recesses are formed in the bottom side of the hull and are arranged in two or more parallel rows.

12. The hydrofoil craft according to claim 1, further comprising a pivotable foil disposed at a bow end of the hull.

13. The hydrofoil craft according to claim 1, further comprising a forward-most air cushion recess disposed at a bow end of the bottom side of the hull, the forward-most air cushion recess being in the form of a hollow groove and being of greater depth toward a bow end of the forward-most air cushion recess and becoming shallower toward an aft end of the forward-most air cushion recess, the forward-most air cushion recess being substantially triangular in shape along a longitudinal section of the hull and substantially triangular in plan view, the forward-most air cushion recess being disposed below an at-rest waterline of the hydrofoil craft.

* * * * *